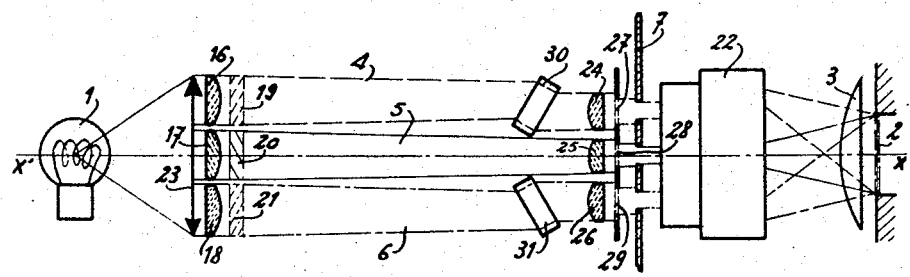
FIG. 1
FIG. 2
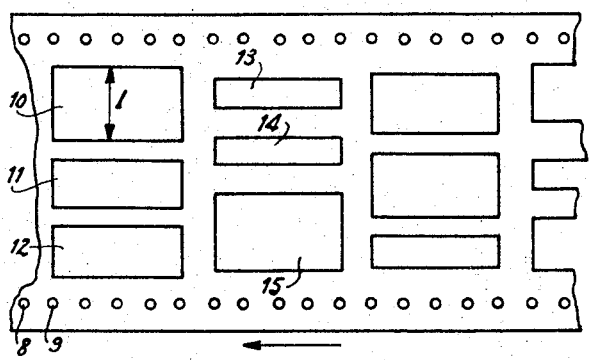
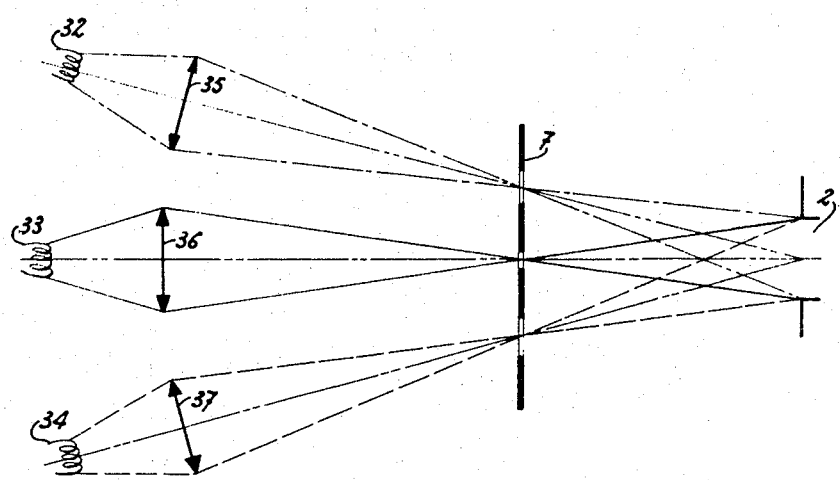
FIG. 3

United States Patent Office

3,449,045
Patented June 10, 1969

3,449,045
ADDITIVE LAMPHOUSE
Armand Roux, 14 Rue Maublanc, Paris 15eme, France
Filed Aug. 5, 1966, Ser. No. 570,647
Claims priority, application France, Aug. 26, 1965,
29,468
Int. Cl. G03b *21/54*
U.S. Cl. 353—31
2 Claims

ABSTRACT OF THE DISCLOSURE

An additive lamphouse which is adapted to mix the light of three differently coloured light beams upon the object to be illuminated. There is provided simple optical and light control means for superposing upon the object three differently coloured images of a single source of white light.

---

The present invention relates to "additive lamphouses," and more particularly to lanterns comprising three separate light beams, of different colours, whose light is mixed upon the object to be illuminated.

A particularly interesting application of these lamphouses involves the printing of positive colour films from negatives of a type in which the emulsion consists of three superimposed layers each of which is sensitive to a distinct spectral band equivalent to approximately one third of the visible spectrum.

For printing these films the so-called subtractive method is most often used requiring the use of coloured filters which are very expensive, but not very stable with time and difficult to grade.

The additive method might be preferable, unfortunate, addative lamphouses of the previous art involve a complex and expensive apparatus generally requiring electronic equipment in order to control and proportion the intensity of the three coloured light beams and therefore their use is not very practical.

It is an object of the present invention to provide an additive lamphouse comprising particularly simple optical and light control means.

According to a preferred embodiment, the additive lamphouse comprises a single source of white light; condenser means, cooperating with said source, for generating an optically parallel beam; beam dividing means, including a first group of three lenses and three differently coloured filters respectively adjacent said lenses, said beam dividing means cooperating with said condenser means for dividing the parallel beam into three differently coloured beams; a second group of three lenses respectively adapted for forming, from the surfaces of the respective lenses of the first group, three differently coloured images at infinity; masking means including three windows respectively intercepting the three respective coloured beams so as to control their respective intensities; and an objective which restores the three coloured images to a finite distance, while causing them to become superimposed.

The various features and advantages of the invention will become more clearly apparent from the following description.

In the accompanying drawing:

FIGURE 1 is a diagram illustrating the principles of an additive lamphouse in accordance with the preferred embodiment of the invention, FIGURE 2 shows a part of a masking strip, and FIGURE 3 shows very diagrammatically a modified embodiment of the invention.

FIGURES 1 and 2 show an optical system designed to give three images, respectively coloured in a different manner, of an incandescent lamp filament 1, these images being superimposed in the window 2 of an optical printer.

The negative (not shown) which is to be reproduced on virgin film by means of the optical printer passes across the above mentioned window. The latter is an apparatus of known type and is not included in the present invention.

The negative is of a type already known comprising three sensitive layers, i.e. its emulsion consists of three superimposed layers of photosensitive material, each of which is sensitive to a spectral band equivalent to approximately one third of the visible spectrum; in ordinary language thereafter, one layer will be said to be sensitive to red, another to green and the other to blue.

The filament of lamp 1 (shown as a spiral for simplicity) is, in fact, a grid centered on the X'X axis of the optical system and it is desired to obtain within the plane of the window which is also centered on X'X, three superimposed layers of photosensitive material, each of illuminated, and are respectively red, green and blue. In practice a field glass 3 is placed across the path of light beams 4, 5, 6, respectively red, green and blue, in front of window 2, so as to cause as much light as possible from these beams (which diverge normally beyond the plane of the window) to penetrate into the optical printer objective.

It is to be understood that use of the "additive lamphouse" of FIGURE 1 to illuminate the negative in an optical printer is shown only by way of example.

In the embodiment of the invention presently described, the masking means consist of a strip 7, a part of which is shown in FIGURE 2.

A paper strip or "matte hand" of standard width is involved e.g. 70 mm. a film perforated at 8, 9, etc., similarly to film of a corresponding type, which is equipped with transversal units comprising three windows, such as 10, 11, 12 of appropriate unequal sizes located transversally with respect to the masking strip.

According to the invention, the optical system of additive illumination is conceived and realized so as to form three diversely coloured luminous beams respectively intercepted by three windows of a same transversal unit, predetermined for each frame of the film. The strip 7 remains in a fixed position throughout the entire frame and is displaced during a brief lapse of time at the end of the frame, so that for the next frame, the three beams are intercepted by the respective windows of the following transversal unit (13, 14, 15).

The stepwise transport of the paper strip 7 can be accomplished by methods currently used in the field of optical printing since the chosen dimensions and perforations, in the film industry, are standard.

A very simple and inexpensive means is therefore available for controlling, for each frame of the film, the quantity or light used to form each of the three images aimed at above by appropriate cutting of the masking strip 7.

In practice, grading according to known methods is carried out for each negative, which makes it possible on the one hand to set the general density of the light, and on the other hand to set the particular combination of coloured filters which are appropriate to the printing of this negative.

Furthermore, for each set of data resulting from the grading, it is possible, through an appropriate calibration of the masking strip 7, to have a particular cutting correspond to the latter. Once this calibration of the masking strip has been carried out once and for all, cutting of the masking strip corresponding to a particular negative will be accomplished without difficulty through the use of a perforating machine of a known type, according to the data obtained from the grading of this negative.

Eventual correction of a colour, should a printing be unsatisfactory, is accomplished very simply by retouching the windows of the masking strip 7 corresponding to it. This of course can be accomplished without any modification of the other two colours, which makes it possible to finally obtain a positive copy of colours of a much higher purity.

In the preferred embodiment of this invention, illustrated in FIGURE 1, the three coloured beams are obtained from a single light source 1.

In order to obtain this remarkable result, the invention involves lighting three identical lenses placed side by side 16–17–18 (FIGURE 1) behind which are respectively placed three filters 19–20–21, respectively red, green and blue, by means of an optically parallel beam coming from source 1; forming, from the illuminated surfaces of these three lenses or of these three filters, three respective coloured images at infinity. It is then possible, by means of objective 22, to bring these images back to a finite distance while superimposing them. This superimposition takes place within the focal plane of this objective which coincides with the plane of window 2.

FIGURE 1 shows a condenser 23 whose function is to produce the optically parallel beam which illuminates lenses 16–17–18, source 1 being to this effect located within the focal plane of said condenser. A uniform illumination of these lenses in thus obtained. Furthermore, these lenses' images formed by the remaining part of the optical system are centered on their axes, which facilitates the design of the optical system.

The three coloured images of lenses 16–17–18 are formed by means of respective lenses 24–25–26, whose focal planes substantially coincide, with lenses 16–17–18.

Lenses 16–17–18 are preferably placed one on top of the other, and this is then equally true for lenses 24–25–26, whose respective axes coincide with those of lenses 16–17–18.

The masking strip 7 then passes horizontally, its plane being vertical, so that width $l$ of each window determines the height of the coloured beam which it transmits.

It should be noted that in addition to the coloured images of lenses 16–17–18, the optical system of FIGURE 1 forms images of the lamp filament 1; in particular, lenses 24–25–26 provide such images.

In accordance with a characteristic of the invention, lenses 24–25–26 are placed against the focal planes of lenses 16–17–18, and the masking strip 7 is located behind lenses 24–25–26, in the immediate vicinity of the latter.

Under these conditions, the three images of source 1 provided by lenses 16–17–18 substantially coincide with the surfaces of lenses 24–25–26, so that the latter give images thereof located substantially within the plane of the masking strip 7.

This makes it possible for the masking strip 7 to stop down the relatively complex luminous beam transmitted by the optical system without being detrimental to the uniformity of lighting of window 2 by each of the coloured beams.

Adjustable flaps simply shown in the drawing as diaphragms 27–28–29 are placed between lenses 24–25–26, and the masking strip 7. These flaps provide an additional means of adjusting the intensity of each of the coloured beams transmitted by the optical system: in practice, their function is to effect correction which traditionally must be made upon each change of emulsion.

FIGURE 1 shows two blades with parallel faces 30 and 31 respectively placed in the path of the red and blue beams. The effect of the latter is to bend the path of these two beams, and therefore to increase their separation at the level of lenses 16 and 18 without modifying the separation, dictated by practical consideration, of the windows in the masking strip. In this way, it is possible to give lenses 16 and 18 dimensions which are as large as possible which of course increases illumination of window 2.

Although FIGURE 1 represents the preferred embodiment of the invention, it is possible to imagine variations using three sources.

FIGURE 3 illustrates very schematically such a variation, in which images of filaments 32–33–34 are formed by three lenses 35–36–37 within the plane of the masking strip 7.

The filters associated with lenses 35 to 37, and the various auxiliary elements of the optical system are not shown.

It will be understood that if the inclination of the three coloured beams is carefully chosen, they will finally illuminate window 2 after having been suitably stopped down by the three respective windows of the masking strip 7.

This type of solution however involves delicate handling for perfect adjustment and is much less satisfactory than the solution of FIGURE 1.

It is to be understood that various modifications can be made with respect to the apparatus shown in FIGURE 1, especially with respect to the design of the various optical systems which it includes, and of the masking means, without departing from the spirit of the invention. In particular, the masking means could consist of shutters provided with suitable control means.

What I claim is:

1. An additive lamphouse comprising a single source of white light; condenser means, cooperating with said source, for generating an optically parallel beam; beam dividing means, including a first group of three lenses and three differently coloured filters respectively adjacent to said lenses, the said lenses having a common focal plane, said beam dividing means cooperating with said condenser means for dividing the parallel beam into three differently coloured beams; a second group of three lenses respectively adapted for forming, from the surfaces of the respective lenses of the first group, three differently coloured images at infinity; masking means including three windows respectively intercepting the three respective coloured beams transmitted across the respective lenses of the second group, the position of the said windows substantially coinciding with that of the respective lenses of the second group and with the focal plane of the lenses of the first group; and an objective which restores the three coloured images to a finite distance while causing them to become superimposed; and means for variably controlling the size of the said windows according to a predetermined program, whereby the respective coloured beams are modulated.

2. An additive lamphouse comprising a single source of white light; a condenser, cooperating with said source, for generating an optically parallel beam; first, second and third lenses located adjacent said condenser in a plane perpendicular to said beam and intercepting first, second and third distinct beam portions: first, second and third differently coloured filter means respectively adjacent said first, second and third lenses and forming first, second and third differently coloured beams respectively; fourth, fifth and sixth lenses respectively intercepting said first, second and third differently coloured beams and respectively forming, at infinity, three differently coloured images from the surfaces of the first, second and third lenses respectively; a masking strip provided with a plurality of groups each including three windows respectively intercepting the first, second and third differently coloured beams respectively transmitted across the fourth, fifth and sixth lenses, the position of the said windows substantially coinciding with that of the fourth, fifth and sixth lenses respectively and with the focal plane of the first, second and third lenses; means for displacing the masking strip by steps in a direction perpendicular to said differently coloured beams, the windows of the successive groups varying in size, according to a predetermined program, whereby the said beams are modulated; and an objective adapted for receiving the first, second and third differently coloured beams after their passage through the windows and for restoring the three differently coloured images to a finite distance, while causing them to become superimposed.

References Cited

UNITED STATES PATENTS 1,857,441    5/1932    De Francisco    88—24

NORTON ANSHER, *Primary Examiner.*

W. A. SIVERTSON, *Assistant Examiner.*

U.S. Cl. X.R.

240—46.59; 353—34